(12) United States Patent
Nakagawa et al.

(10) Patent No.: US 10,907,268 B2
(45) Date of Patent: Feb. 2, 2021

(54) METHOD FOR PRODUCING MULTI-LAYER BUS BAR UNIT

(71) Applicants: SUNCALL CORPORATION, Kyoto (JP); STANLEY ELECTRIC CO., LTD., Tokyo (JP)

(72) Inventors: Masaya Nakagawa, Kyoto (JP); Shojiro Wakabayashi, Kyoto (JP); Mamoru Yuasa, Tokyo (JP); Toshifumi Watanabe, Tokyo (JP)

(73) Assignees: SUNCALL CORPORATION, Kyoto (JP); STANLEY ELECTRIC CO., LTD., Tokyo (JP)

( * ) Notice: Subject to any disclaimer, the term of this patent is extended or adjusted under 35 U.S.C. 154(b) by 374 days.

(21) Appl. No.: 15/575,208

(22) PCT Filed: May 16, 2016

(86) PCT No.: PCT/JP2016/002379
§ 371 (c)(1),
(2) Date: Nov. 17, 2017

(87) PCT Pub. No.: WO2016/185706
PCT Pub. Date: Nov. 24, 2016

(65) Prior Publication Data
US 2018/0148855 A1      May 31, 2018

(30) Foreign Application Priority Data

May 18, 2015 (JP) .................................. 2015-100708

(51) Int. Cl.
*C25D 13/04* (2006.01)
*C25D 13/12* (2006.01)
(Continued)

(52) U.S. Cl.
CPC .............. *C25D 13/04* (2013.01); *B32B 15/08* (2013.01); *C25D 13/12* (2013.01); *C25D 13/22* (2013.01);
(Continued)

(58) Field of Classification Search
CPC .............................. C25D 13/04; B32B 15/08
See application file for complete search history.

(56) References Cited

U.S. PATENT DOCUMENTS 3,345,455 A * 10/1967 Goody ................... H01B 13/18
                                                174/112
3,466,745 A *  9/1969 Stopp ..................... H02G 5/005
                                                29/825

(Continued)

FOREIGN PATENT DOCUMENTS

CN          1351396 A      5/2002
JP       2003230864 A      8/2003
(Continued)

OTHER PUBLICATIONS

International Preliminary Report on Patentability (IPRP) dated Nov. 30, 2017 issued in counterpart International Application No. PCT/JP2016/002379.

(Continued)

*Primary Examiner* — Leith S Shafi
*Assistant Examiner* — Nicholas R Krasnow
(74) *Attorney, Agent, or Firm* — Holtz, Holtz & Volek PC (57) ABSTRACT

A method for producing a multi-layer bus bar unit includes preparing a plurality of metal flat plate-shaped bus bars, each with electrode terminal parts at two or more locations, depositing a coating film over an entire surface of each bus bar by electrodeposition coating, subjecting a coating film of a predetermined bus bar to a heating treatment so that the coating film is completely cured, subjecting another bus bar (Continued)

to a heat treatment so that the bus bar is semi-cured, and obtaining a multi-layer structure by alternately overlapping, and then subjecting to a pressure and heating treatment, the bus bar with the completely-cured coating film and the bus bar with the semi-cured coating film, so that the semi-cured coating film is completely cured and the plurality of bus bars adhere to each other by the completely-cured coating film.

14 Claims, 7 Drawing Sheets (51) Int. Cl.
*B32B 15/08* (2006.01)
*C25D 13/22* (2006.01)
*H01B 13/00* (2006.01)
*H01B 3/40* (2006.01)
*B32B 37/24* (2006.01)
*C09D 5/44* (2006.01)
*H01B 3/30* (2006.01)
*B32B 38/00* (2006.01)
*H02G 5/00* (2006.01)

(52) U.S. Cl.
CPC .... *H01B 13/0036* (2013.01); *B32B 2037/243* (2013.01); *B32B 2038/0076* (2013.01); *B32B 2255/06* (2013.01); *B32B 2307/202* (2013.01); *B32B 2311/00* (2013.01); *B32B 2457/00* (2013.01); *C09D 5/44* (2013.01); *H01B 3/30* (2013.01); *H01B 3/305* (2013.01); *H01B 3/306* (2013.01); *H01B 3/40* (2013.01); *H02G 5/005* (2013.01)

(56) References Cited

U.S. PATENT DOCUMENTS

| | | | | |
|---|---|---|---|---|
| 3,662,088 A * | 5/1972 | Wright | ................... | H02G 5/005 174/72 B |
| 3,708,609 A * | 1/1973 | Iosue | ................... | H05K 1/0263 174/72 B |
| 4,133,101 A * | 1/1979 | Glover | ................... | B23P 11/00 264/156 |
| 4,342,881 A * | 8/1982 | Fukuda | ................... | H02G 5/005 174/72 B |
| 4,346,257 A * | 8/1982 | Moss | ................... | H02G 5/005 174/72 B |
| 4,430,522 A * | 2/1984 | Bader | ................... | H02G 5/005 174/72 B |
| 4,517,406 A * | 5/1985 | Erdle | ................... | H02G 5/005 174/72 B |
| 4,867,696 A * | 9/1989 | Demler, Jr. | ............ | H02G 5/005 439/212 |
| 7,037,392 B2 * | 5/2006 | Baumann | ................. | H02K 3/14 156/309.6 |
| 2004/0069527 A1 * | 4/2004 | Vanhoutte | .............. | H02G 5/005 174/149 B |
| 2007/0031646 A1 | 2/2007 | Yamazaki et al. | | |
| 2007/0166559 A1 | 7/2007 | Tai et al. | | |
| 2010/0186998 A1 | 7/2010 | Tai et al. | | |
| 2011/0308834 A1 * | 12/2011 | Takahashi | ............. | H02M 7/003 174/68.2 |
| 2014/0151082 A1 * | 6/2014 | Erdle | ...................... | H02B 3/00 174/68.2 |
| 2017/0103831 A1 * | 4/2017 | Guo | ....................... | H01B 3/302 |
| 2018/0309281 A1 * | 10/2018 | Ichikawa | ............... | H02G 5/005 |

FOREIGN PATENT DOCUMENTS

| | | | |
|---|---|---|---|
| JP | 2005251673 A | | 9/2005 |
| JP | 2006024449 A | * | 1/2006 |
| JP | 2006024449 A | | 1/2006 |
| JP | 2007194370 A | | 8/2007 |
| JP | 2007215340 A | | 8/2007 |

OTHER PUBLICATIONS

European Office Action dated Oct. 8, 2019 issued in counterpart European Application No. 16796102.8.
International Search Report (ISR) and Written Opinion dated Jun. 14, 2016 issued in International Application No. PCT/JP2016/002379.
Extended European Search Report (EESR) dated Nov. 30, 2018 issued in counterpart European Application No. 16796102.8.

* cited by examiner

| | TEST CYCLE NUMBER (CYCLES) | | | | |
|---|---|---|---|---|---|
| | 0 | 500 | 1000 | 2000 | 3000 |
| UPPER PART: TENSILE STRENGTH(kgf) / LOWER PART: SHEAR STRENGTH(MPa) | 187/10.2 | 215/11.7 | 132/7.2 | 97/5.3 | 91/5.0 |
| | 194/10.6 | 106/5.8 | 104/5.7 | 87/4.7 | 88/4.8 |
| | 241/13.1 | 196/10.7 | 127/6.9 | 101/5.5 | 88/4.8 |
| AVERAGE | 207/11.3 | 172/9.4 | 121/6.6 | 95/5.1 | 89/4.8 |

METHOD FOR PRODUCING MULTI-LAYER BUS BAR UNIT

TECHNICAL FIELD

The present invention relates to a method for producing a multi-layer bus bar unit, and more particularly relates to a method for producing a multi-layer bus bar unit in which a plurality of metal bodies (electric conductors) running parallel to each other are covered with resin covering layers.

BACKGROUND ART

An example of a conventional multi-layer bus bar unit of this type is shown in Patent Literature 1 disclosed under the title of "MULTI-LAYER BUS BAR ASSEMBLY AND MOLDING DEVICE FOR THE SAME."

Figure 11:
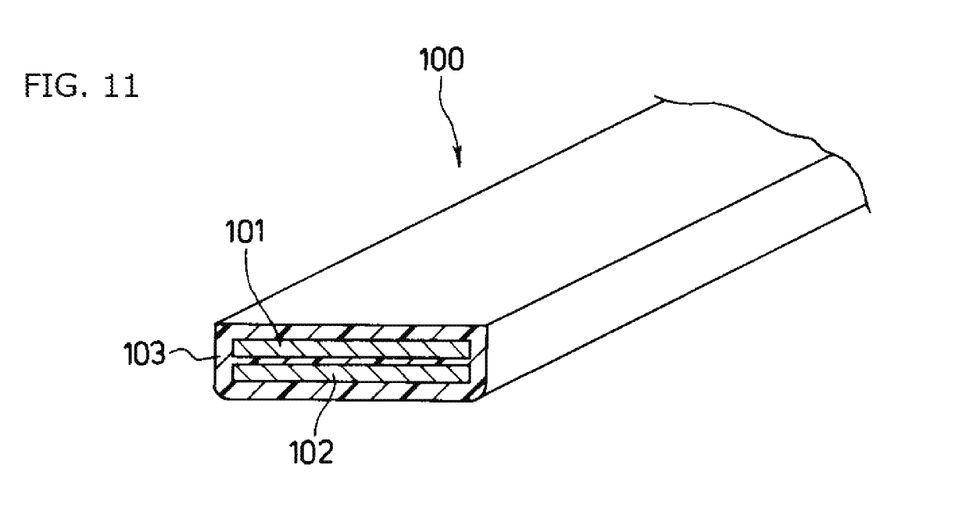
FIG. 11 is an explanatory diagram showing a conventional example.

As shown in FIG. 11, a disclosed multi-layer bus bar assembly 100 includes: flat plate-shaped conductors (bus bars) 101 and 102 running parallel to each other face-to-face; and a resin molded part 103 that fills a gap between the bus bars 101 and 102 and covers all circumferences of the respective bus bars 101 and 102.

CITATION LIST

Patent Literature

Patent Literature 1: Japanese Patent Application Laid-Open No: 2007-215340

SUMMARY OF INVENTION

Technical Problem

By the way, to cover the bus bars 101 and 102 with the resin molded part 103 in the multi-layer bus bar assembly 100 having the above-described configuration, the bus bars 101 and 102 set in a cavity formed by an upper mold and a lower mold are subjected to insert injection molding with a molding resin to form the resin molded part 103. Thus, every time a multi-layer bus bar unit having different specifications such as a shape and dimensions is demanded, a new mold needs to be designed and manufactured. Therefore, it may take time from the designing to launching of a product, thereby missing the timing to commercialize the product. Moreover, initial introduction costs including a cost for designing and manufacturing the mold are increased, thus leading to increase in the production costs.

If an interval between the bus bars 101 and 102 is reduced to reduce a thickness of the multi-layer bus bar assembly 100 and increase capacitance between the bus bars 101 and 102, a weld line, a short, and a void of the molding resin may be generated especially in the gap between the bus bars 101 and 102 during the injection molding, thus leading to poor pressure resistance between the bus bars 101 and 102.

Due to the stress applied by operations such as assembling and wiring when the multi-layer bus bar assembly 100 is mounted to a device or thermal history during long-term use, separation may occur between the bus bars 101 and 102 and the resin molded part 103, thus deteriorating reliability for long-term use.

The present invention has been made in view of the above-described problems and it is an object of the present invention to provide a multi-layer bus bar unit capable of: easily coping with a demand for a multi-layer bus bar assembly (referred to as a "multi-layer bus bar unit" in the present invention) having different specifications such as a shape and dimensions; reducing an amount of time required before launching a product; reducing production costs including initial introduction costs such as a cost for designing and manufacturing a die; and ensuring long-term reliability including electrical and temporal reliability.

Solution to Problem

To solve the above problems, one aspect of the present invention provides a method for producing a multi-layer bus bar unit having a multi-layer structure including a plurality of bus bars. The method includes: preparing a plurality of metal flat plate-shaped bus bars each having electrode terminal parts at two or more locations; depositing a coating film over an entire surface of each of the plurality of bus bars by electrodeposition coating with an electrodeposition coating material having heat resistance and insulation properties; subjecting a coating film of a predetermined bus bar among the plurality of bus bars with the coating films to a heating treatment, so that the coating film of the predetermined bus bar is completely cured; subjecting a bus bar other than the predetermined bus bar among the plurality of bus bars with the coating films to a heat treatment so that the bus bar other than the predetermined bus bar is semi-cured; and obtaining the multi-layer structure by alternately overlapping, and then subjecting to a pressure and heating treatment, the bus bar having the completely-cured coating film and the bus bar having the semi-cured coating film, so that the semi-cured coating film is completely cured and the plurality of bus bars adhere to each other by the completely-cured coating film.

The electrodeposition coating material may be any of polyimide, polyamide, epoxy, and polyamidimide.

The method may further include applying masking to the electrode terminal parts of each of the plurality of bus bars before the depositing of the coating films, and removing the masking and thereby exposing the electrode terminal parts after the obtaining of the multi-layer structure.

Alternatively, the method may further include removing the completely-cured coating films covering the electrode terminal parts and thereby exposing the electrode terminal parts after the obtaining of the multi-layer structure.

Another aspect of the present invention provides a method for producing a multi-layer bus bar unit having a multi-layer structure including a plurality of bus bars. The method includes: preparing a plurality of metal flat plate-shaped bus bars each having electrode terminal parts at two or more locations; depositing a coating film over an entire surface of each of the plurality of bus bars by electrodeposition coating with an electrodeposition coating material having heat resistance and insulation properties; subjecting the plurality of bus bars with the coating films to a heating treatment, so that the plurality of bus bars are semi-cured; and obtaining the multi-layer structure by overlapping, and then subjecting to a pressure and heating treatment, the bus bars having the semi-cured coating films with a space retention member being interposed therebetween, so that the semi-cured coating films are completely cured and the plurality of bus bars adhere to each other by the completely-cured coating films.

The electrodeposition coating material may be any of polyimide, polyamide, epoxy, and polyamidimide.

The space retention member may be any of a glass bead, a silica bead, and a sheet material of the same kind as the electrodeposition coating material.

The method may further include applying masking to the electrode terminal parts of each of the plurality of bus bars before the depositing of the coating films, and removing the masking and thereby exposing the electrode terminal parts after the obtaining of the multi-layer structure.

Alternatively the method may further include removing the completely-cured coating films covering the electrode terminal parts and thereby exposing the electrode terminal parts after the obtaining of the multi-layer structure.

Advantageous Effects of Invention

According to the present invention, the coating film of the predetermined bus bar among the plurality of bus bars with the coating films formed by electrodeposition coating is completely cured, and the coating film of the bus bar other than the predetermined bus bar is semi-cured. The bus bar having the completely-cured coating film and the bus bar having the semi-cured coating film are overlapped alternately, and the semi-cured coating film is completely cured. In this manner, the multi-layer bus bar unit having the multi-layer structure in which the plurality of bus bars adhere to each other by the completely-cured coating film is fabricated.

Accordingly, a press die for punching a bus bar is generally only one component newly required to commercialize a product coping with a demand for different specifications. Thus, it is possible to cope with a new product easily, and an amount of time required before launching the product can be reduced. Additionally, as compared to a case where an injection mold is used, production costs including initial costs such as a cost for manufacturing a die can be reduced.

Moreover, the coating films never experience, because of their production method, the occurrence of defects such as a weld line or a short, which may be generated in the injection molding. In addition, the occurrence of voids can be reduced sufficiently.

Furthermore, a coating material having a high heat resistance property and a high mechanical strength, such as polyimide, polyamide, epoxy, or preferably polyamidimide, is used in the electrodeposition coating. Consequently, the occurrence of defects such as separation caused by stress applied during use or thermal history can be reduced sufficiently, thereby ensuring long-term reliability including electrical and temporal reliability.

DESCRIPTION OF EMBODIMENTS

Hereinafter, preferred embodiments of the present invention will be described in detail with reference to FIGS. 1A-10B (identical parts will be denoted by the same reference numerals). The embodiments to be described below are preferred specific examples of the present invention, and thus include technically-preferred various limitations. The scope of the present invention, however, is not limited to these embodiments unless explicitly stated in the following description that the present invention is limited thereby.

Figure 1A:
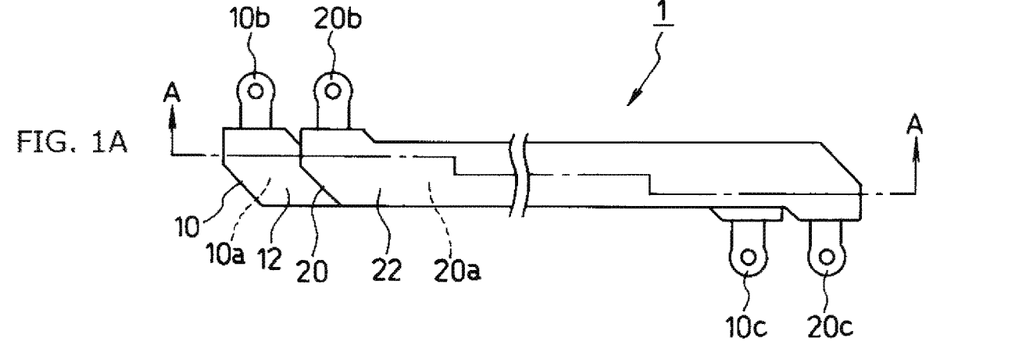
FIGS. 1A and 1B are explanatory diagrams showing a multi-layer bus bar unit of a first embodiment.
Figure 1B:
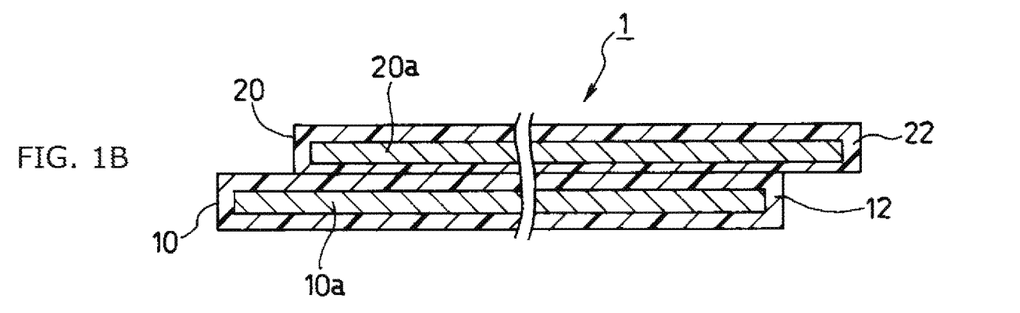

FIGS. 1A and 1B are explanatory diagrams showing a multi-layer bus bar unit of a first embodiment according to the present invention. FIG. 1A is a plan view, and FIG. 1B is a cross-sectional view taken along line A-A in FIG. 1A.

In a multi-layer bus bar unit 1 of the present embodiment, two bus bars, i.e., a first bus bar 10 and a second bus bar 20 each formed from a metal member, are covered with resin covering layers 12 and 22 formed from polyimide, polyamide, epoxy, or preferably polyamidimide having excellent heat resistance and insulation properties. The bus bars 10 and 20 adhere to each other by the resin covering layers 12 and 22 to form the multi-layer bus bar unit 1 having a two-layer structure.

The first bus bar 10 constituting the multi-layer bus bar unit 1 has: an extended part 10a having a long plate shape; and a pair of electrode terminal parts 10b and 10c protruding in a direction substantially perpendicular to an extended direction from respective ends of the extended part 10a. Similarly, the second bus bar 20 constituting the multi-layer bus bar unit 1 has: an extended part 20a having a long plate shape; and a pair of electrode terminal parts 20b and 20c protruding in a direction substantially perpendicular to an extended direction from respective ends of the extended part 20a.

The extended part 10a of the first bus bar 10 and the extended part 20a of the second bus bar 20 each function as a current path (power path). Among the pair of electrode terminal parts 10b and 10c in the first bus bar 10 and the electrode terminal parts 20b and 20c in the second bus bar 20, one set of the electrode terminal parts 10b and 20b are connected to a positive electrode and a negative electrode of an external power source and function to receive externally-supplied power, and the other set of the electrode terminal parts 10c and 20c are connected to a positive electrode and a negative electrode of an external device and function to feed the power having passed through the first bus bar 10 and the second bus bar 20 to the external device.

In other words, the first bus bar 10 and the second bus bar 20 have substantially the same outline and dimensions, and have a positional relationship in which the first bus bar 10 and the second bus bar 20 are disposed face-to-face while being displaced relative to each other in a longitudinal direction thereof.

The first bus bar 10 and the second bus bar 20 run parallel to each other with the extended parts 10a and 20a facing each other with a uniform predetermined interval therebetween. The first bus bar 10 and the second bus bar 20 are covered with the resin covering layers 12 and 22 over the entire surfaces thereof excluding the pair of electrode terminal parts 10b and 10c in the first bus bar 10 and the pair of electrode terminal parts 20b and 20c in the second bus bar 20. At the same time, the gap between the extended parts 10a and 20a running parallel to each other is filled also with the resin covering layers 12 and 22, so that the extended parts 10a and 20a adhere to each other via the resin covering layers 12 and 22.

A method for producing the multi-layer bus bar unit having the above-described configuration will be described next with reference to FIGS. 2A-2D.

Figure 2A:
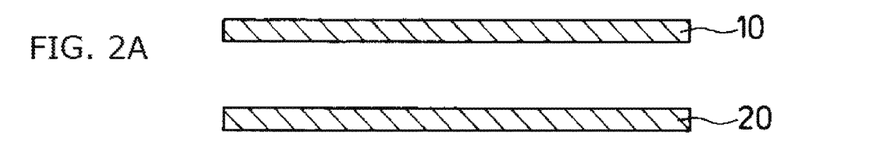
FIGS. 2A-2D are explanatory diagrams showing a production process of the multi-layer bus bar unit of the first embodiment.

First, in a step of preparing bus bars shown in FIG. 2A, two bus bars, i.e., the flat plate-shaped first bus bar 10 and second bus bar 20 formed from metal members machined to have predetermined substantially the same outline and dimensions by means of punching with a punching press die, for example, are prepared.

The first bus bar 10 constituting the multi-layer bus bar unit 1 has: the extended part 10a having a long plate shape; and the pair of electrode terminal parts 10b and 10c protruding in the direction substantially perpendicular to the extended direction from the respective ends of the extended part 10a. The second bus bar 20 constituting the multi-layer bus bar unit 1 has: the extended part 20a having a long plate shape; and the pair of electrode terminal parts 20b and 20c protruding in the direction substantially perpendicular to the extended direction from the respective ends of the extended part 20a (see FIGS. 1A and 1B).

Figure 2B:
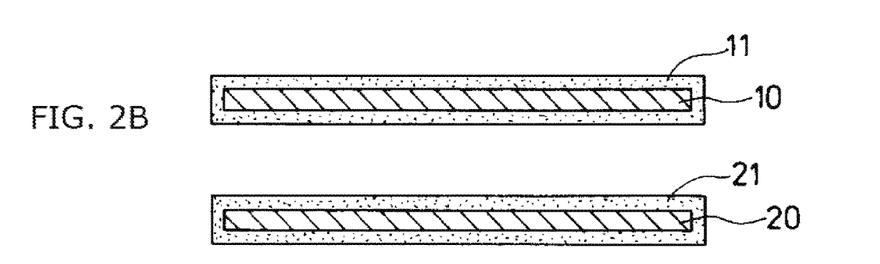

Next, in a film coating step in FIG. 2B, masking is applied in advance to each of the pair of electrode terminal parts 10b and 10c in the first bus bar 10 and the pair of electrode terminal parts 20b and 20c in the second bus bar 20. Coating films 11 and 21 are formed over the entire surface of the first bus bar 10 excluding the pair of electrode terminal parts 10b and 10c and the entire surface of the second bus bar 20 excluding the pair of electrode terminal parts 20b and 20c.

The coating film 11 of the first bus bar 10 and the coating film 21 of the second bus bar 20 are each formed by surface deposition by a conventional electrodeposition coating process with an electrodeposition coating material by a solution of a resin, such as polyimide, polyamide, epoxy, or preferably polyamidimide having excellent heat resistance and insulation properties.

Figure 2C:
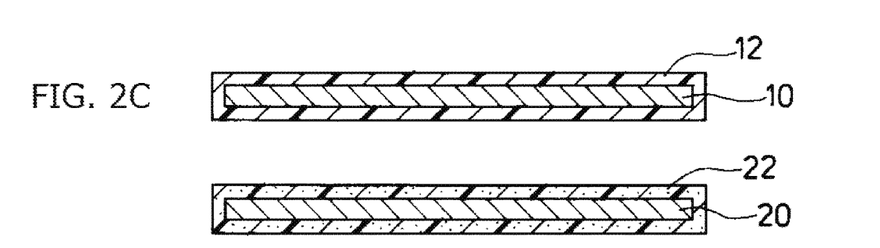

Next, in a step of thermal curing the coating films in FIG. 2C, the first bus bar 10 is subjected to a heating treatment at an appropriate temperature, so that the coating film 11 is dried by baking to form the completely-cured resin covering layer 12. In this manner, the resin covering layer 12 having a predetermined and uniform thickness can be obtained. Even if the coating film 11 deposited on the surface of the first bus bar 10 has a pinhole, such a pinhole is compensated by its surrounding electrodeposition coating material during the heating treatment and thus filled up with the delayed arrival coating material. Thus, uniformity in the thickness of the resin covering layer 12 can be ensured.

The second bus bar 20, on the other hand, is subjected to a heating treatment at an appropriate temperature, so that the coating film 21 is semi-cured to form the resin covering layer 22 in a soft state.

Figure 2D:
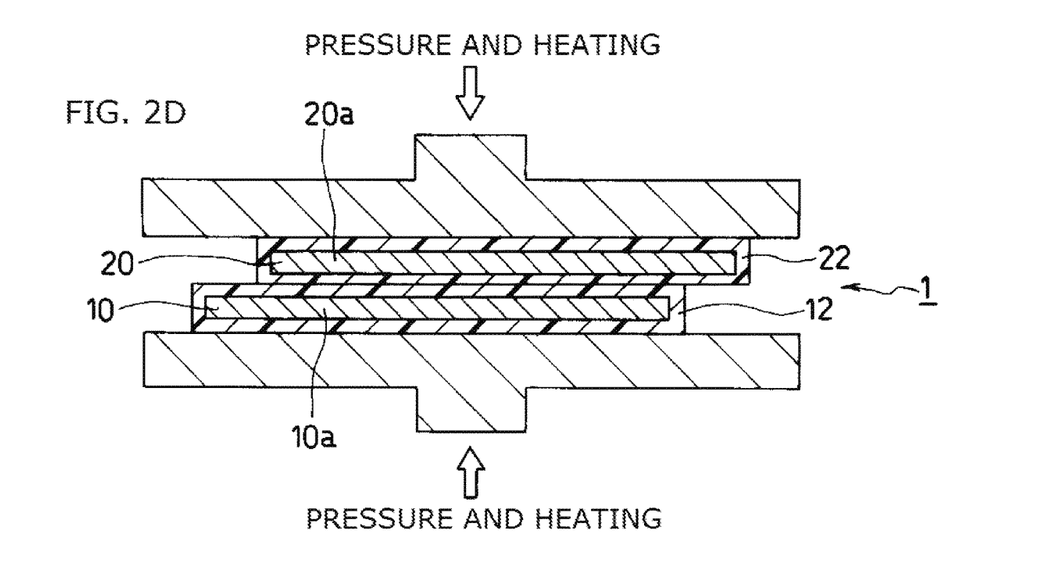

Finally, in a bonding step in FIG. 2D, the first bus bar 10 covered with the completely-cured resin covering layer 12 and the second bus bar 20 covered with the semi-cured resin covering layer 22 are overlapped with each other with the extended parts 10a and 20a being displaced relative to each other by a predetermined distance in the longitudinal direction. The first bus bar 10 and the second bus bar 20 are subjected to a heating treatment at an appropriate temperature while applying pressure thereto from the both sides thereof with an appropriate pressure. Consequently, the semi-cured resin covering layer 22 of the second bus bar 20 is cured again by being dried by baking with the thickness thereof being reduced by the application of pressure, thereby resulting in complete cure. In this manner, the multi-layer bus bar unit 1 having the two-layer structure in which the first bus bar 10 and the second bus bar 20 are bonded to each other by the adhesion between the resin covering layers 12 and 22 is completed.

For the large-scale production of such a multi-layer bus bar unit, continuously-connected multi-layer bus bar units are introduced into the production process. Accordingly, a dicing step of cutting the continuously-connected multi-layer bus bar units at predetermined dicing positions for singulation into individual multi-layer bus bar units is provided after the bonding step, although such a step is not shown in the figures.

The present inventors performed a confirmation test on adhesive strength of metal plates by resin covering layers using thermal shock test. Its test samples, test conditions, test direction, and test results will be described below.

Figure 3A:
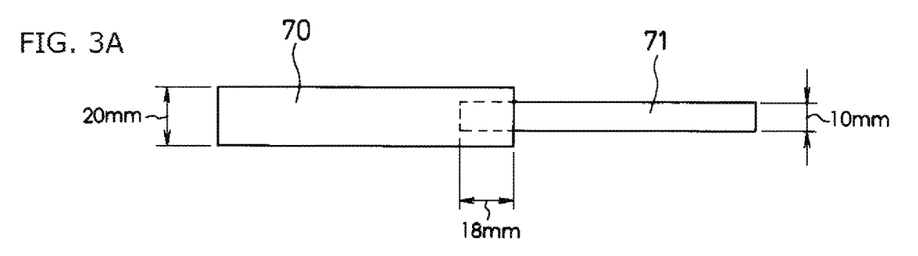
FIGS. 3A and 3B are explanatory diagrams showing a test sample for thermal shock test.
Figure 3B:
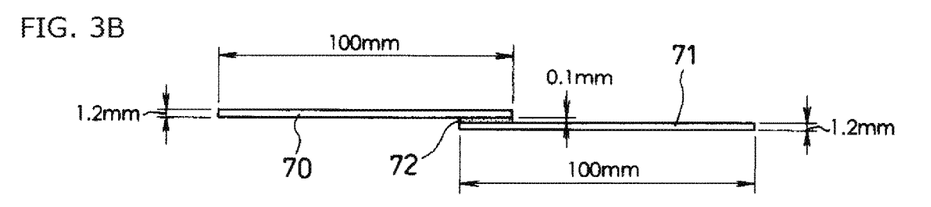

As shown in FIGS. 3A and 3B (FIG. 3A is a plan view, and FIG. 3B is a side view), a first metal plate 70 having a thickness of 1.2 mm, a width of 20 mm, and a length of 100 mm and a second metal plate 71 having a thickness of 1.2 mm, a width of 10 mm, and a length of 100 mm were used as a test sample. The first metal plate 70 in which a coating film formed by an electrodeposition coating process using a polyamidimide resin solution was completely cured by a heating treatment and the second metal plate 71 in which a coating film similarly formed by the electrodeposition coating process using the polyamidimide resin solution was semi-cured by a heating treatment were overlapped with each other by 18 mm from the front edge of the second metal plate 71. The first metal plate 70 and the second metal plate 71 were subjected to a heating treatment while applying pressure thereto from the both sides thereof with an appropriate pressure. Consequently, the semi-cured resin covering layer of the second metal plate 71 was cured again, thereby resulting in complete cure. In this manner, the first metal plate 70 and the second metal plate 71 adhered to each other and thus integrated together via a resin covering layer 72 having a layer pressure of 0.1 mm (average).

As to the test conditions, 500 cycles, 1000 cycles, 2000 cycles, and 3000 cycles of thermal shock test, where one cycle (30 minutes) corresponds to −40° C./15 minutes and 165° C./15 minutes, were performed. The number (n) of the test samples was n=3 for each thermal shock cycle number.

The test method was based on JIS K6850 [test method for tensile shear adhesive strength between adhesive and rigid adherend]. The test rate was 0.3 mm/min.

Figure 4:
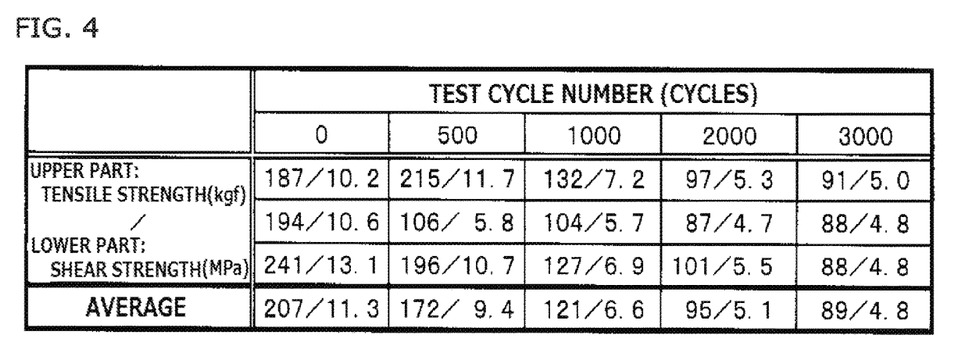
FIG. 4 is a table showing test results of thermal shock test.

As shown in a table in FIG. 4, despite of being exposed to severe thermal shock test with a temperature variation range of 200° C. or more, the test results show that an average tensile load of about 90 kgf and an average shear strength of about 5 MPa were maintained after the 3000 cycles of thermal shock test as compared to initial values (a tensile strength of about 200 kgf and a shear strength of about 11 MPa). In other words, the test sample has the average tensile strength after the 3000 cycles of thermal shock test of about 90 kgf and thus has a strength retention rate corresponding to about 45% of the initial value. Further, the test sample has the average shear strength of about 5 MPa and thus has a strength retention rate also corresponding to about 45% of the initial value.

Although a high-temperature heating test for 300° C./five minutes was performed in addition to the aforementioned adhesive strength test, no separation between metal plates 55 and 56 was observed.

By producing a multi-layer bus bar unit by the above-described production method, the electrodeposition film coating step, the thermal curing step, and the bonding step complete the production process. Thus, a press die for punching a bus bar is generally only one component newly required for each demand for a multi-layer bus bar unit having different specifications such as a shape and dimensions. Thus, it is possible to cope with demanded specifications of a multi-layer bus bar unit easily, and an amount of time required before launching a product can be reduced. Additionally, as compared to a case where an injection mold is used, production costs including initial introduction costs such as a cost for designing and manufacturing a die can be reduced.

Moreover, the resin covering layers for making the first bus bar and the second bus bar adhere to each other never experience, because of their production method, the occurrence of defects such as a weld line or a short, which may be generated in the injection molding. In addition, the occurrence of voids can be reduced sufficiently.

Furthermore, a coating material having a high heat resistance property and a high mechanical strength, such as polyimide, polyamide, epoxy, or preferably polyamidimide, is used in the electrodeposition coating. Consequently, the occurrence of defects such as separation caused by stress applied during use or thermal history can be reduced sufficiently, thereby ensuring long-term reliability including electrical and temporal reliability.

Figure 5A:
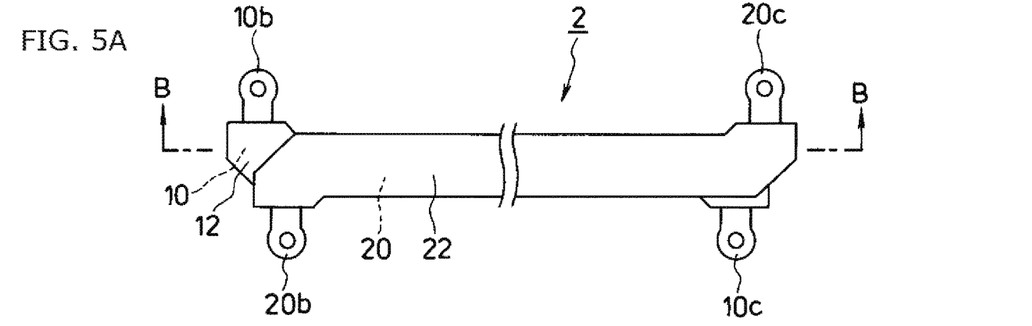
FIGS. 5A and 5B are explanatory diagrams showing a multi-layer bus bar unit of a second embodiment.
Figure 5B:
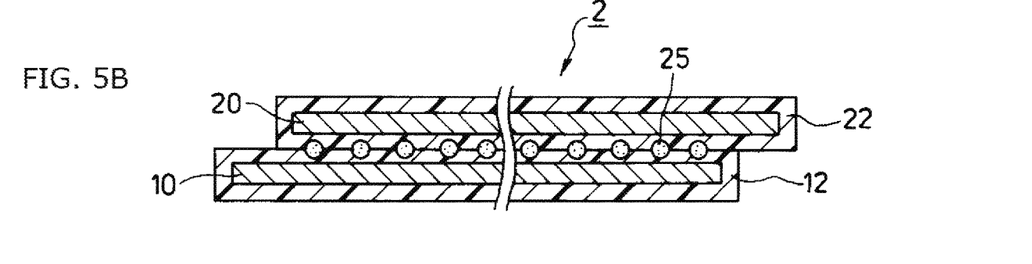

As shown in FIGS. 5A and 5B (FIG. 5A is a plan view, and FIG. 5B is a cross-sectional view taken along line B-B in FIG. 5A) as a second embodiment, an interval between a first bus bar 10 and a second bus bar 20 can be kept at an appropriate interval and uniformly by disposing space retention members 25 in an adhesion part between the first bus bar 10 covered with a resin covering layer 12 and the second bus bar 20 covered with a resin covering layer 22.

Figures 6A, 6B:
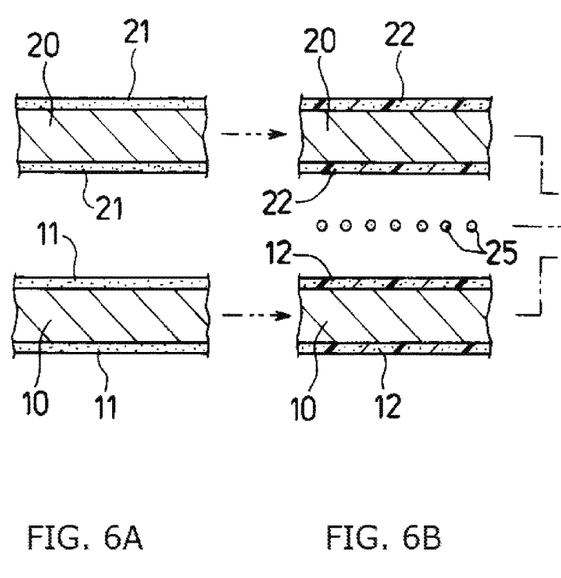
FIGS. 6A-6C are explanatory diagrams showing a production process of the multi-layer bus bar unit of the second embodiment.

Specifically, as shown in FIG. 6A, two bus bars, i.e., the first bus bar 10 formed from a metal flat plate machined to have a predetermined outline and dimensions and having masking applied to a pair of electrode terminal parts 10b and 10c and the second bus bar 20 formed from a metal flat plate machined to have a predetermined outline and dimensions and having masking applied to a pair of electrode terminal parts 20b and 20c, are prepared in advance. Coating films 11 and 21 are formed over the entire surface of the first bus bar 10 excluding the pair of electrode terminal parts 10b and 10c and the entire surface of the second bus bar 20 excluding the pair of electrode terminal parts 20b and 20c by the electrodeposition coating process (see FIGS. 5A and 5B).

Next, the coating films 11 and 21 of the first bus bar 10 and the second bus bar 20 are subjected to a heating treatment to form the semi-cured resin covering layers 12 and 22 as shown in FIG. 6B.

Figure 6C:
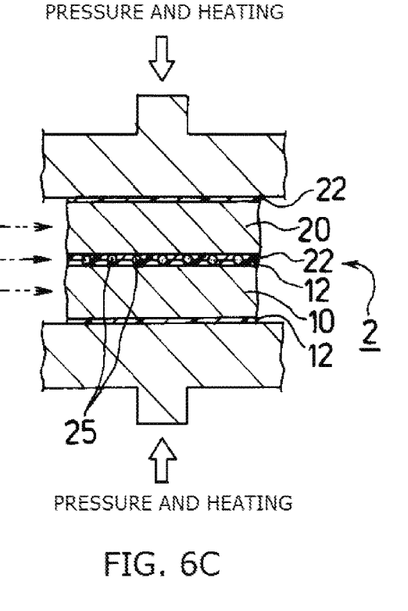

Finally, the space retention members 25 formed from, for example, a plurality of glass beads or silica beads having a uniform diameter are disposed at substantially regular intervals between adhesion surfaces of the semi-cured resin covering layers 12 and 22 of the first bus bar 10 and the second bus bar 20 as shown in FIG. 6C. The first bus bar 10 and the second bus bar 20 are overlapped with each other with the space retention members 25 being interposed therebetween. The first bus bar 10 and the second bus bar 20 are subjected to a heating treatment while applying pressure thereto from the both sides thereof with an appropriate pressure. Consequently, the semi-cured resin covering layers 12 and 22 of the first bus bar 10 and the second bus bar 20 are completely cured. In this manner, a multi-layer bus bar unit 2 having a two-layer structure in which the first bus bar 10 and the second bus bar 20 with the interval therebetween being retained by the space retention members 25 are bonded to each other by the adhesion between the resin covering layers 12 and 22 is formed.

With the use of the space retention members 25, a uniform interval between the bus bars can be reliably ensured even when the lengths of the bus bars are elongated. In addition, the interval between the bus bars can be easily set to a desired interval by appropriately selecting a size (diameter) of the space retention member 25. Even when the space retention members formed from a material of a different kind are included in the resin covering layers for making the bus bars adhere to each other as described above, the shear tensile strength can be kept at a practically problem-free level due to the large adhesion area of the elongated bus bars.

Figure 7A:
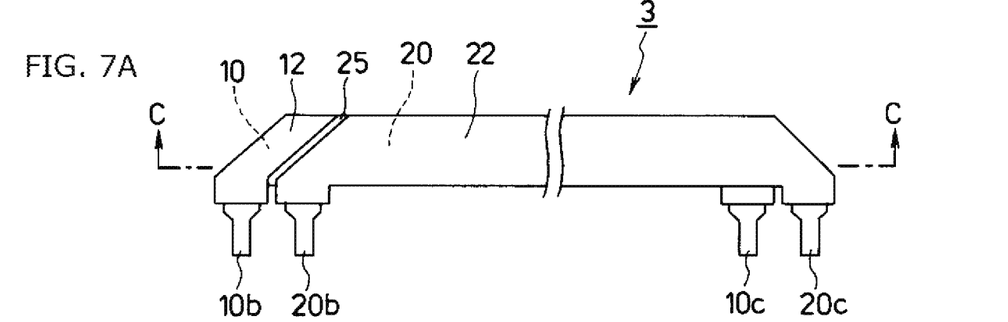
FIGS. 7A and 7B are explanatory diagrams showing a multi-layer bus bar unit of a third embodiment.
Figure 7B:
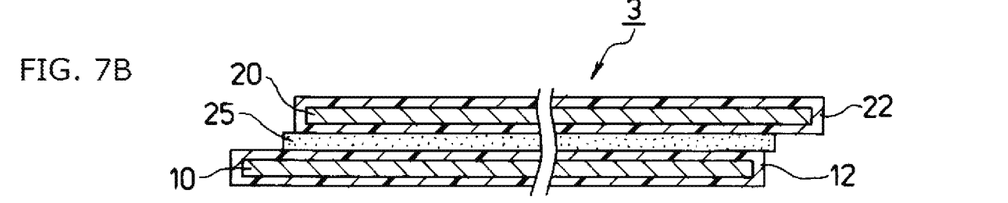

As a third embodiment, a sheet material of the same kind as a resin material (electrodeposition coating material) for forming resin covering layers can be used as a space retention member in place of the above-described space retention members formed from glass or silica beads. Specifically, a multi-layer bus bar unit 3 having a two-layer structure is formed, for example, by making a first bus bar 10 covered with a resin covering layer 12 formed from polyamidimide and a second bus bar 20 similarly covered with a resin covering layer 22 formed from polyamidimide adhere to each other via a space retention member 25 formed from a polyamidimide (PAI) sheet as shown in FIGS. 7A and 7B (FIG. 7A is a plan view, and FIG. 7B is a cross-sectional view taken along line C-C in FIG. 7A).

Although a production process of the multi-layer bus bar unit 3 according to the present embodiment is not shown in the figures, coating films are formed over the entire surface of the first bus bar 10 excluding a pair of electrode terminal parts 10b and 10c and the entire surface of the second bus bar 20 excluding a pair of electrode terminal parts 20b and 20c by the electrodeposition coating process. Thereafter, the coating films are subjected to a heating treatment at an appropriate temperature, so that the coating films are semi-cured to form the resin covering layers 12 and 22. The first bus bar 10 and the second bus bar 20 covered with the semi-cured resin covering layers 12 and 22, respectively, are overlapped with each other with the space retention member 25, formed from the PAI sheet, being interposed therebetween. The first bus bar 10 and the second bus bar 20 are subjected to a heating treatment at an appropriate temperature while applying pressure thereto from the both sides thereof with an appropriate pressure.

Consequently, the semi-cured resin covering layers 12 and 22 are cured again by being dried by baking, thereby resulting in complete cure. In this manner, the multi-layer bus bar unit 3 having the two-layer structure including the two bus bars bonded to each other by the adhesion between the first bus bar 10 covered with the resin covering layer 12 and the second bus bar 20 covered with the resin covering layer 22 via the space retention member 25 formed from the PAI sheet is completed.

The multi-layer bus bar unit 3 that uses the PAI sheet as the space retention member 25 employs the sheet material of the same kind as the resin material (electrodeposition coating material) for forming the resin covering layers 12 and 22 to be adhesion layers. Thus, a high shear tensile strength can be obtained due to its fine adhesion force.

Figure 8A:
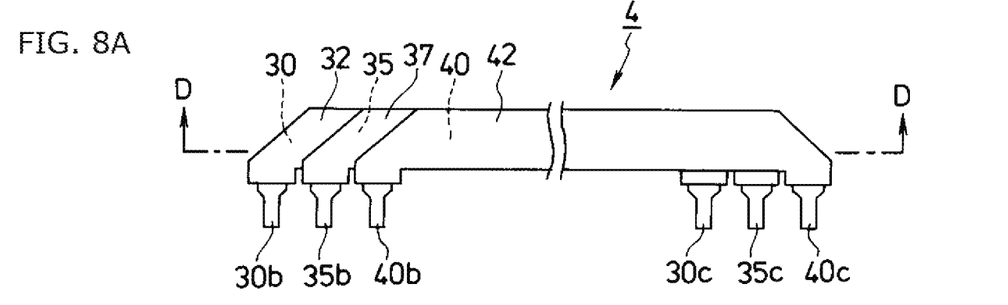
FIGS. 8A and 8B are explanatory diagrams showing a multi-layer bus bar unit of a fourth embodiment.
Figure 8B:
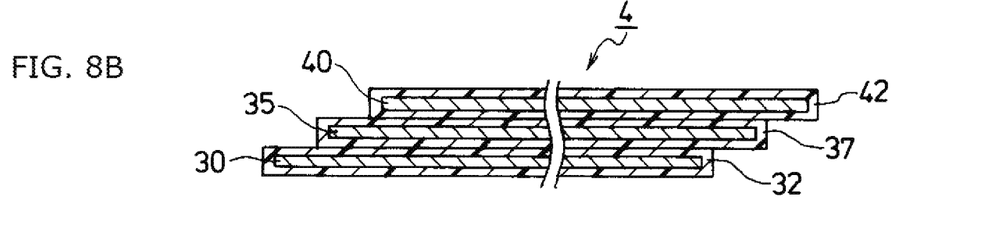

Although the multi-layer bus bar units 1, 2, and 3 each having the two-layer structure employing the two bus bars including the first bus bar 10 and the second bus bar 20 have been described in the first to third embodiments described above, a multi-layer bus bar unit is not necessarily limited to the two-layer structure. As a fourth embodiment (see FIGS. 8A and 8B (FIG. 8A is a plan view, and FIG. 8B is a cross-sectional view taken along line D-D in FIG. 8A)), a multi-layer bus bar unit 4 having, for example, a three-layer structure formed from three bus bars including a first bus bar 30 covered with a resin covering layer 32, a second bus bar 35 covered with a resin covering layer 37, and a third bus bar 40 covered with a resin covering layer 42 can be formed.

Figure 9A:
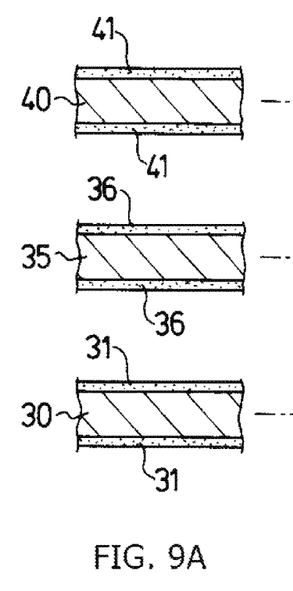
FIGS. 9A-9C are explanatory diagrams showing a production process of the multi-layer bus bar unit of the fourth embodiment.

In such a case, as shown in FIG. 9A, the three bus bars, i.e., the first bus bar 30 formed from a metal flat plate machined to have a predetermined outline and dimensions and having masking applied to a pair of electrode terminal parts 30b and 30c, the second bus bar 35 formed from a metal flat plate machined to have a predetermined outline and dimensions and having masking applied to a pair of electrode terminal parts 35b and 35c, and the third bus bar 40 formed from a metal flat plate machined to have a predetermined outline and dimensions and having masking applied to a pair of electrode terminal parts 40b and 40c, are prepared in advance. Coating films 31, 36, and 41 are formed over the entire surface of the first bus bar 30 excluding the pair of electrode terminal parts 30b and 30c, the entire surface of the second bus bar 35 excluding the pair of electrode terminal parts 35b and 35c, and the entire surface of the third bus bar 40 excluding the pair of electrode terminal parts 40b and 40c by the electrodeposition coating process (see FIGS. 8A and 8B).

Figure 9B:
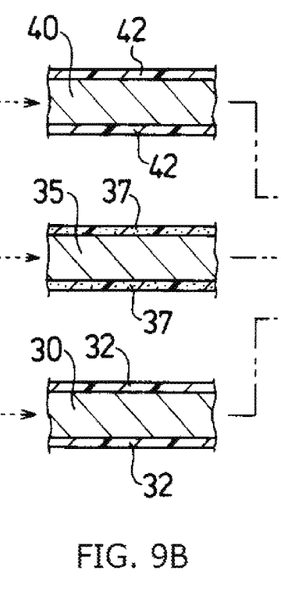

Next, the coating films 31 and 41 of the two bus bars, i.e., the first bus bar 30 and the third bus bar 40, among the three bus bars are subjected to a heating treatment to form the completely-cured resin covering layers 32 and 42 as shown in FIG. 9B. The coating film 36 of the second bus bar 35, on the other hand, is subjected to a heating treatment to form the semi-cured resin covering layer 37.

Figure 9C:
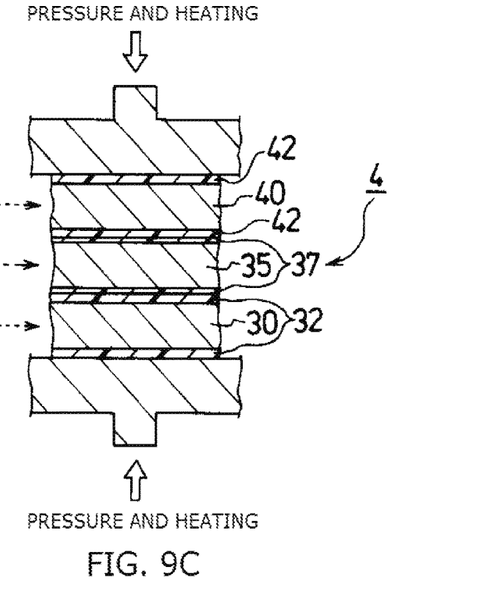

Finally, as shown in FIG. 9C, the first bus bar 30 and the third bus bar 40 covered with the completely-cured resin covering layers 32 and 42, respectively, are overlapped with each other with the second bus bar 35 covered with the semi-cured resin covering layer 37 being interposed therebetween. These bus bars are subjected to a heating treatment while applying pressure thereto from the both sides thereof with an appropriate pressure. Consequently, the semi-cured resin covering layer 37 of the second bus bar 35 is completely cured. In this manner, the multi-layer bus bar unit 4 having the three-layer structure including the three bus bars bonded to one another by the adhesion between the resin covering layers 32 and 37 of the first bus bar 30 and the second bus bar 35 and the adhesion between the resin covering layers 37 and 42 of the second bus bar 35 and the third bus bar 40 is formed.

Figure 10A:
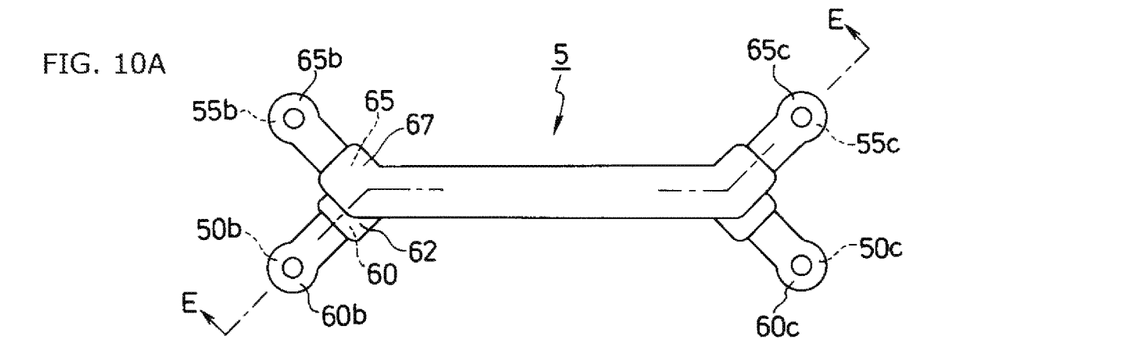
FIGS. 10A and 10B are explanatory diagrams showing a multi-layer bus bar unit of a fifth embodiment.
Figure 10B:
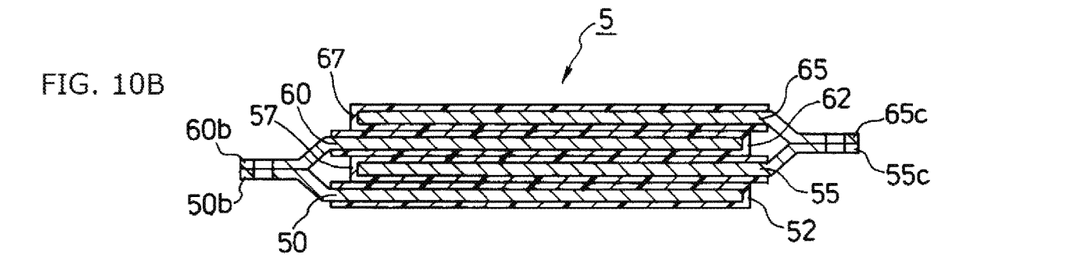

FIGS. 10A and 10B (FIG. 10A is a plan view, and FIG. 10B is a cross-sectional view taken along line E-E in FIG. 10A) shows a fifth embodiment. In the present embodiment, a multi-layer bus bar unit 5 having a four-layer structure in which four bus bars, i.e., a first bus bar 50 covered with a resin covering layer 52 over the entire surface thereof excluding electrode terminal parts 50b and 50c, a second bus bar 55 covered with a resin covering layer 57 over the entire surface thereof excluding electrode terminal parts 55b and 55c, a third bus bar 60 covered with a resin covering layer 62 over the entire surface thereof excluding electrode terminal parts 60b and 60c, and a fourth bus bar 65 covered with a resin covering layer 67 over the entire surface thereof excluding electrode terminal parts 65b and 65c, are bonded to one another is formed.

The electrode terminal part 50b of the first bus bar 50 at the bottom layer and the electrode terminal part 60b of the third bus bar 60 at the third layer from the bottom as well as the electrode terminal part 50c and the electrode terminal part 60c are connected to each other by swaging, for example. Similarly, the electrode terminal part 55b of the second bus bar 55 at the second layer from the bottom and the electrode terminal part 65b of the fourth bus bar 65 at the top layer as well as the electrode terminal part 55c and the electrode terminal part 65c are connected to each other by swaging, for example.

Although a production process of the multi-layer bus bar unit 5 according to the present embodiment is not shown in the figures, coating films are formed over the entire surface of the first bus bar 50 excluding the pair of electrode terminal parts 50b and 50c, the entire surface of the second bus bar 55 excluding the pair of electrode terminal parts 55b and 55c, the entire surface of the third bus bar 60 excluding the pair of electrode terminal parts 60b and 60c, and the entire surface of the fourth bus bar 65 excluding the pair of electrode terminal parts 65b and 65c by the electrodeposition coating process. Thereafter, the coating films formed on the bus bars positioned at every other layer, for example, the first bus bar 50 and the third bus bar 60, in the multi-layer bus bar unit 5 having the four-layer structure are subjected to a heating treatment to be completely cured. The coating films formed on the remaining second bus bar 55 and fourth bus bar 65 are subjected to a heating treatment to be semi-cured.

Thereafter, the first bus bar 50 and the third bus bar 60 covered with the completely-cured resin covering layers 52 and 62 and the second bus bar 55 and the fourth bus bar 65 covered with the semi-cured resin covering layers 57 and 67 are overlapped alternately. These bus bars are subjected to a heating treatment at an appropriate temperature while applying pressure thereto from the both sides thereof with an appropriate pressure. Consequently, the semi-cured resin covering layers 57 and 67 are cured again by being dried by baking, thereby resulting in complete cure. In this manner, the multi-layer bus bar unit having the four-layer structure including the four bus bars is completed.

In this case, the first bus bar 50 and the third bus bar 60 having the electrode terminal parts 50b and 60b joined together and the second bus bar 55 and the fourth bus bar 65 having the electrode terminal parts 55b and 65b joined together are layered alternately. Thus, capacitance between the joined electrode terminal parts 50b and 60b and the joined electrode terminal parts 55b and 65b can be increased. Specifically, when the adhesion area of each of the four bus bars equals an opposed area between bus bars 101 and 102 that constitute a conventional multi-layer bus bar assembly 100 shown in FIG. 11 and an interval between two bus bars bonded to each other among the four bus bars equals an interval between the bus bars 101 and 102 that constitute the multi-layer bus bar assembly 100, the multi-layer bus bar unit 5 of the present embodiment has capacitance about three times that of the conventional multi-layer bus bar assembly 100.

In the first to fifth embodiments described above, the pressure and heating treatment is performed when at least one bus bar is in a semi-cured state having high viscosity. Thus, such a bus bar is prone to generate air bubbles or entrain air bubbles. Therefore, the bonding step involving the application of pressure and heating is preferably performed in a vacuum or under reduced pressure environment to prevent the mixing-in of air bubbles, although the bonding step can be performed under atmospheric pressure environment depending on demanded specifications of a multi-layer bus bar unit.

However, suppose a case where by introducing a bus bar covered with a completely-cured resin covering layer or a hard space retention member into the bonding step, the pressure and heating treatment is performed with the completely-cured resin covering layer or the hard space retention member being positioned between the bus bars opposed to each other. In such a case, even when air bubbles are mixed in by performing the pressure and heating treatment under the atmospheric pressure environment, the diameters of the air bubbles in the thickness direction of the bus bar can be kept smaller than or equal to the thickness of the resin covering layer that has been deformed thinly from the semi-cured state to the completely-cured state. Thus, the thickness accuracy between the bus bars can be kept at or above a certain level, and deterioration in pressure resistance by the resin covering layers can be reduced.

In the production processes of the multi-layer bus bar units described above, masking is applied to the electrode terminal parts before the film coating step of the coating films, so that the coating films are formed over the entire surfaces of the bus bars excluding the electrode terminal parts in the film coating step. However, the coating films may be formed over the entire surfaces of the bus bars in the film coating step, and the electrode terminal parts may be exposed in a post-treatment step after the fabrication of the multi-layer bus bar unit. Specifically, a method for removing the resin covering films that cover the electrode terminal parts in the multi-layer bus bar unit by laser machining, for example, is conceivable.

Moreover, a bus bar module in which a bus bar and an external circuit are integrated together can be configured by providing an exposed part at an appropriate position in the bus bar covered with a resin covering layer by a masking treatment before the film coating step or laser machining after the fabrication and then joining the exposed part with an electrode part of the external circuit, such as a circuit board, by solder joint, for example. In this case, achievement in downsizing can be expected as compared to a case where the bus bar and the external circuit are prepared separately and then modularized.

As described above, in the method for producing a multi-layer bus bar unit according to the present invention, the production process is completed by the electrodeposition film coating step, the thermal curing step, and the bonding step. Thus, a press die for punching a bus bar is generally only one component newly required for each demand for a multi-layer bus bar unit having different specifications such as a shape and dimensions. Thus, it is possible to cope with demanded specifications of a multi-layer bus bar unit easily, and an amount of time required before launching a product can be reduced. Additionally, as compared to a case where an injection mold is used, production costs including initial introduction costs such as a cost for designing and manufacturing a die can be reduced. It is also possible to cope with small lot production easily.

Moreover, the resin covering layers for covering the bus bars and making the bus bars adhere to each other are formed by the electrodeposition coating process. Thus, defects such as a weld line or a short, which may be generated in the injection molding, never occur because of their production method. In addition, the occurrence of voids can be reduced sufficiently.

Moreover, a coating material having a high heat resistance property and a high mechanical strength, such as polyimide, polyamide, epoxy, or preferably polyamidimide, is used in the electrodeposition coating. Consequently, the occurrence of defects such as separation caused by stress applied during use or thermal history can be reduced sufficiently, thereby ensuring long-term reliability including electrical and temporal reliability.

Furthermore, when a plurality of bus bars, each formed from a metal flat plate, are multiply-disposed face-to-face via resin covering layers, the formation of the resin covering layers is performed by the step including the electrodeposition coating and the pressure and heating treatment. Thus, an interval between the bus bars disposed face-to-face can be made small, thereby increasing capacitance between the bus bars. Consequently, the use in a power line of a switching circuit, for example, enables the prevention of surge by fine decoupling effect due to the capacitance between the bus bars.

REFERENCE SIGNS LIST 1 multi-layer bus bar unit
2 multi-layer bus bar unit
3 multi-layer bus bar unit
4 multi-layer bus bar unit
5 multi-layer bus bar unit
10 first bus bar
10a extended part
10b electrode terminal part
10c electrode terminal part
11 coating film
12 resin covering layer
20 second bus bar
20a extended part
20b electrode terminal part
20c electrode terminal part
21 coating film
22 resin covering layer
25 space retention member
30 first bus bar
30b electrode terminal part
30c electrode terminal part
31 coating film
32 resin covering layer
35 second bus bar
35b electrode terminal part
35c electrode terminal part
36 coating film
37 resin covering layer
40 third bus bar
40b electrode terminal part
40c electrode terminal part
41 coating film
42 resin covering layer
50 first bus bar
50b electrode terminal part
50c electrode terminal part
52 resin covering layer
55 second bus bar
55b electrode terminal part
55c electrode terminal part
57 resin covering layer
60 third bus bar
60b electrode terminal part
60c electrode terminal part
62 resin covering layer
65 fourth bus bar
65b electrode terminal part
65c electrode terminal part
67 resin covering layer
70 first metal plate 71 second metal plate
72 resin covering layer

The invention claimed is:

1. A method for producing a multi-layer bus bar unit having a multi-layer structure including a plurality of metal flat plate-shaped bus bars, each of the bus bars having electrode terminal parts at two or more locations, the method comprising:
depositing a coating over all surfaces of each of the plurality of bus bars, or depositing the coating over all surfaces of each of the plurality of bus bars except for the electrode terminal parts, the coating being deposited by electrodeposition coating with an electrodeposition coating material having heat resistance and insulation properties;
subjecting the coating of a first bus bar among the plurality of bus bars to heating so that the coating of the first bus bar is completely cured;
subjecting the coating of a second bus bar among the plurality of bus bars to heating so that the coating of the second bus bar is semi-cured; and
obtaining the multi-layer structure by alternately overlapping, and then subjecting to a pressure and heating treatment, the first bus bar having the completely-cured coating and the second bus bar having the semi-cured coating, so that the semi-cured coating is completely cured and the plurality of bus bars adhere to each other by the completely-cured coating.

2. The method according to claim 1, wherein the electrodeposition coating material is any of polyimide, polyamide, epoxy, and polyamidimide.

3. The method according to claim 1, wherein the coating is deposited over all the surfaces of each of the plurality of bus bars except for the electrode terminal parts, and the method further comprises:
before the depositing of the coating, applying masking to the electrode terminal parts of each of the plurality of bus bars, and
after the obtaining of the multi-layer structure, removing the masking and thereby exposing the electrode terminal parts.

4. The method according to claim 1, wherein the coating is deposited over all the surfaces of each of the plurality of bus bars, and the method further comprises:
after the obtaining of the multi-layer structure, removing the completely-cured coating covering the electrode terminal parts and thereby exposing the electrode terminal parts.

5. The method according to claim 1, wherein each of the bus bars comprises a plate-shaped extended part, and the electrode terminal parts extend in a direction perpendicular to an extending direction of the plate-shape extended part.

6. The method according to claim 5, wherein each of the bus bars comprises two of the electrode terminal parts, the two electrode terminal parts extending in opposite directions from the plate-shaped extended part.

7. The method according to claim 6, wherein in the obtaining of the multi-layer structure, the bus bars are alternately overlapped such that the respective electrode terminal parts thereof do not overlap each other.

8. The method according to claim 5, wherein each of the bus bars comprises two of the electrode terminal parts, the two electrode terminal parts extending in a same direction from the plate-shaped extended part.

9. The method according to claim 8, wherein in the obtaining of the multi-layer structure, the bus bars are alternately overlapped such that the respective electrode terminal parts thereof do not overlap each other.

10. The method according to claim 1, wherein:
the plurality of bus bars, on which the coating is deposited, comprise a third bus bar;
the method further comprises subjecting the coating of the third bus bar to heating so that the coating of the third bus bar is completely cured; and
in the obtaining of the multi-layer structure, the bus bars are alternately overlapped such that the second bus bar is layered between the first bus bar and the third bus bar.

11. The method according to claim 1, wherein:
the plurality of bus bars, on which the coating is deposited, comprise a third bus bar and a fourth bus bar;
the method further comprises:
subjecting the coating of the third bus bar to heating so that the coating of the third bus bar is completely cured, and
subjecting the coating of the fourth bar to heating so that the coating of the fourth bar is semi-cured; and
in the obtaining of the multi-layer structure, the bus bars are alternately overlapped such that the second bus bar is layered between the first bus bar and the third bus bar, and such that the third bus bar is layered between the second bus bar and the fourth bus bar.

12. The method according to claim 11, further comprising:
connecting the electrode terminal parts of the first bus bar to the electrode terminal parts of the third bus bar; and
connecting the electrode terminal parts of the second bus bar to the electrode terminal parts of the fourth bus bar.

13. The method according to claim 12, wherein:
the electrode terminal parts of the first bus bar are connected to the electrode terminal parts of the third bus bar by swaging; and
the electrode terminal parts of the second bus bar are connected to the electrode terminal parts of the fourth bus bar by swaging.

14. The method according to claim 1, further comprising:
producing the plurality of bus bars by punching with a punching press die.

* * * * *